Patented Oct. 9, 1945

2,386,606

UNITED STATES PATENT OFFICE 2,386,606

PROCESS OF TREATING COMPLEX COMPOUNDS CONTAINING A SIDE ISOPROPYL GROUP AND PRODUCTS THEREFROM

Torsten Hasselstrom, Savannah, Ga., assignor to G and A Laboratories, Inc., Savannah, Ga., a corporation of Georgia No Drawing. Application July 11, 1941, Serial No. 402,032

6 Claims. (Cl. 260—668)

This invention relates to the art of treating chemical compounds which include an aromatic ring having a side group of iso- or secondary type such as an isopropyl group; and is particularly concerned with the splitting of the side group from retene and like compounds.

It is well known to the art that retene responds only with difficulty to those general reactions employed in the aromatic series for producing dyes, pharmaceuticals, artificial resins, etc. Derivatives are only obtained in small quantities from retene, and this in particular decreases its industrial possibilities.

Retene is found in the tars of highly resinous pines, and can be produced by the dry distillation of very resinous pine and fir wood. Structurally, it may be regarded as methyl-isopropyl-phenanthrene.

It has now been found that retene, and retene-containing materials may be split, so that the isopropyl group is separated as propylene, and a residue which mainly comprises 1-methylphenanthrene can be obtained, by heating retene in the presence of a catalyst capable of splitting off the isopropyl group.

As an example of procedure 250 grams of retene and 50 grams of dehydrated fuller's earth were heated with vigorous reflux for nine hours, the initial temperature being around 320 degrees C. The non-condensable gas was passed over bromine which in time was transformed into a colorless liquid. At the end of the treatment, the still residue material was cooled, dissolved in hexane, and filtered to eliminate the catalyst. The filtrate was evaporated to expel the major part of the solvent, and permitted to stand in the icebox over night. A brownish crude hydrocarbon mass was separated, and removed by filtration, with a yield of 97 grams. Upon recrystallization, from hexane, fine glistening scales were obtained with a melting point of 122–122.5 degrees C. (cor.), and upon analysis was found to be 1-methylphenanthrene.

In a further example of practice, 250 grams of retene were vigorously refluxed with 50 grams of dehydrated fuller's earth for nine hours. Gas was evolved and collected as before. After dissolving the 118 grams of the refluxed reaction product in hexane and filtering, it was subjected to fractionation in vacuum at one millimeter pressure. Three fractions were separated as follows: (I) 155–165 degrees, 78 grams (solidified on standing); (II) 165–175 degrees, 20 grams (non-solidifying oil); (III)) 18 grams of residue. Fraction (I) was recrystallized from hexane, yielding crystals as before with a melting point of 122–123 degrees (cor.), which were found to be 1-methylphenanthrene.

The crystals from these examples did not depress the melting point of analytic samples of 1-methylphenanthrene. They form a picrate as brick red needles melting at 139 degrees C. (cor.) when recrystallized from alcohol.

Instead of employing retene, it is feasible to utilize directly pine tar or other retene-containing materials.

Refluxing may be accomplished for times between 5 to 72 hours at temperatures from 320 to 400 degrees C., with increasing yields, but reasons of economy and the development of degradation products render the stated longer time an apparent maximum. From 5 to 100 per cent of fuller's earth may be employed in the treatment.

The presently preferred catalyst is fuller's earth, but it is feasible to employ diatomaceous earth, silica gel, activated carbon, broken pottery, and the like non-metallic bodies of large surface area and adsorbent capability, either individually or in mixture, for producing the splitting away of the side group.

The 1-methylphenanthrene thus produced can easily be nitrated, sulfonated, halogenated, subjected to Friedel-Craft reactions, and the like, and thus becomes a starting material for dyes, pharmaceuticals, artificial resins, plastics, etc. The material, in crude or purified form, may be used as a stable vehicle in printer's ink and like products.

While hexane has been indicated as a solvent for the further treatment and separation of the 1-methylphenanthrene, it is feasible to employ solvent naphtha, alcohols, benzol, benzene homologs, and the like, alone or in mixtures: and these materials are herein referred to as organic solvents of the 1-methylphenanthrene.

Glycols, glycol acids and like derivatives of the separated propylene radical are unstable at the high temperatures, and the gas which is evolved is propylene, and can be recovered in the form of a bromide which immediately lends itself to hydroxylation for producing a glycol.

It has further been found possible to employ the reaction as a means of preparing 1-methylphenantrene from gum rosin, wood rosin, and like substances containing abietic acids. For this treatment, the abietic acid is heated to produce abietanes by decarboxylation, and is then heated further, preferably in the presence of a dehydrogenating catalyst, such as sulfur, selenium, nickel, platinum, palladium, etc., to form the retene, which is then given the further treatment by the aforesaid procedure.

Thus, abietic acid in pure form or mixed with impurities may be subjected directly to heating at 250 to 300 degrees C. in a vessel which is closed to prevent oxidation, and thereby converted in major part to abietanes by decarboxylation. These abietanes are then subjected to treatment in the presence of a dehydrogenating catalyst, and are thus converted to retene, which in turn is then subjected to treatment over fuller's earth or corresponding catalyst, to produce the methylphenanthrene. Such operations may be conducted in separate stills, with a passage of the product from still to still as the successive operations are performed thereon, with filtering to eliminate solid catalysts.

It is also feasible to accomplish the conversion essentially in a single operation by heating gum rosin or wood rosin under pressure, to effect destructive distillation at high temperature in the presence or absence of a dehydrogenating catalyst, and continuing the treatment with the release and refluxing of gases and vapors, until decarboxylation and dehydrogenation have occurred, and the isopropyl group has been split away by the action of the aforesaid splitting catalyst.

It is obvious that the invention is not limited solely to the examples of practice stated, but that it may be utilized in many ways within the scope of the appended claims.

I claim:

1. The process of treating retene which comprises heating the compound in the presence of a catalyst for splitting away the side group and thereby producing 1-methylphenanthrene and propylene.

2. The process of preparing 1-methylphenanthrene, which comprises heating retene substantially to the boiling point in the presence of a catalyst capable of splitting away the isopropyl group.

3. The process of preparing 1-methylphenanthrene, which comprises heating retene in the presence of fuller's earth, under refluxing, for a period of 5 to 72 hours.

4. The process of preparing 1-methylphenanthrene, which comprises heating retene in the presence of fuller's earth with refluxing, dissolving the refluxed material in an organic solvent, filtering, and recovering crystalline 1-methylphenanthrene from the filtrate.

5. The process of preparing 1-methylphenanthrene, which comprises heating retene in the presence of fuller's earth with refluxing, dissolving the refluxed material in an organic solvent, filtering, fractionally distilling the filtrate in vacuum and separating the fraction distilling at 155 to 165 degrees C. at one millimeter pressure, crystallizing a solid therefrom which comprises 1-methylphenanthrene, and recrystallizing the same from an organic solvent.

6. The process of preparing 1-methylphenanthrene, which comprises heating retene for a period of 5 to 72 hours at a temperature of substantially 320 to 400 degrees C. in the presence of a catalyst capable of splitting away the isopropyl group.

TORSTEN HASSELSTROM.